(12) United States Patent
Chen et al.

(10) Patent No.: US 8,572,051 B1
(45) Date of Patent: Oct. 29, 2013

(54) MAKING PARALLEL EXECUTION OF STRUCTURED QUERY LANGUAGE STATEMENTS FAULT-TOLERANT

(75) Inventors: Mengmeng Chen, Belmont, CA (US); Yali Zhu, Foster City, CA (US); Thierry Cruanes, Foster City, CA (US); Alan Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/569,377

(22) Filed: Aug. 8, 2012

(51) Int. Cl.
*G06F 17/30* (2006.01)

(52) U.S. Cl.
USPC ........................................ 707/687; 707/999.2

(58) Field of Classification Search
None
See application file for complete search history.

(56) References Cited

U.S. PATENT DOCUMENTS

2009/0106306 A1* 4/2009 Das et al. .................. 707/103 R
2012/0150819 A1* 6/2012 Lindahl et al. ................ 707/687

* cited by examiner

*Primary Examiner* — Anteneh Girma
(74) *Attorney, Agent, or Firm* — Hickman Palermo Truong Becker Bingham Wong LLP (57) ABSTRACT

Parallel execution of SQL statements is made fault-tolerant. Specifically, during parallel query processing, a new row source is created that allows checkpoints to be stored at certain points in the query processing. If a failure occurs, then the query can be restarted from the most recent checkpoint (rather than from the very beginning of the query). The checkpoints are implemented at operation boundaries where rows need to be redistributed among processes. These are natural checkpoint locations because (1) each subsequent operation can proceed from the output of the previous operation, which is stored as a checkpoint, and (2) these operation completions tend to be points in the computation where the query state is minimized, thus minimizing checkpoint storage requirements.

18 Claims, 4 Drawing Sheets

MAKING PARALLEL EXECUTION OF STRUCTURED QUERY LANGUAGE STATEMENTS FAULT-TOLERANT

FIELD OF THE INVENTION

The present invention relates to parallel execution of database queries and, more specifically, to techniques for reducing the amount of work that needs to be repeated in the event that such a query encounters a fault.

BACKGROUND

The term "database" refers to a collection of data that is multidimensional in the sense that internal links between its entries make the information accessible from a variety of perspectives. This is in contrast to a traditional file system, sometimes called a "flat file," which is a one-dimensional storage system, meaning that it presents its information from a single point of view. Whereas a flat file containing information about composers and their compositions might provide a list of compositions arranged by composer, a database might present all the works by a single composer, all the composers who wrote a particular type of music, and perhaps the composers who wrote variations of another composer's work.

Abstraction can be used to hide internal complexities. Database management systems (DBMS) hide the complexities of a database's internal structure, allowing the user of the database to imagine that the information stored in the database is arranged in a more useful format. In particular, a DBMS contains routines that translate commands stated in terms of a conceptual view of the database into the actions required by the actual storage system. This conceptual view of the database is called a "database model."

In the case of a relational database model, the conceptual view of the database is that of a collection of tables consisting of rows and columns. For example, information about a company's employees might be viewed as a table containing a row for each employee and columns labeled name, address, employee identification number, and so on. In turn, the DBMS would contain routines that allow the application software to select certain entries from a particular row of the table or perhaps to report the range of values found in the salary column—even though the information is not actually stored in rows and columns.

In a relational database model, data is portrayed as being stored in rectangular tables, called "relations," which are similar to the format in which information is displayed by spreadsheet programs. A row in a relation is called a "tuple." Tuples include information about a particular entity. Columns in a relation are referred to as "attributes" because each entry in a column describes some characteristic, or attribute, of the entity represented by the corresponding tuple.

A DBMS based on the relational model includes routines to perform select, project, and join operations, which can then be called from the application software. In this manner, the application software can be written as though the database were actually stored in the simple tabular form of the relational model. Today's relational database management systems do not necessarily provide routines to perform select, project, and join operations in their raw form. Instead, modern systems provide routines that might be combinations of these basic steps. An example is the language SQL (Structured Query Language, both proprietary forms and past and previous ANSI standard forms), which forms the backbone of most relational database query systems.

Queries stated in SQL are essentially declarative statements. SQL statements may be read as descriptions of information desired rather than as sequences of activities to be performed. The significance of this is that SQL relieves application programmers from the burden of developing algorithms for manipulating relations—the programmers may merely describe the information desired. Each SQL query statement can contain roughly three clauses: a "select" clause, a "from" clause, and a "where" clause. Roughly speaking, such a statement is a request for the result of forming the join of all the relations listed in the "from" clause, selecting those tuples that satisfy the conditions in the "where" clause, and then projecting those tuples listed in the "select" clause. In addition to statements for performing queries, SQL also encompasses statements for defining the structure of relations, creating relations, and modifying the contents of relations.

In some database management systems, the processing of a SQL statement is performed by a single server process. However, if a DBMS provides a parallel query feature, then multiple processes can work together simultaneously to process a single SQL statement. This capability is called parallel query processing. By dividing the work necessary to process a statement among multiple server processes, the DBMS can process the statement more quickly than if only a single server process processed that statement.

The parallel query feature can dramatically improve performance for data-intensive operations associated with decision support applications or very large database environments. Symmetric multiprocessing (SMP), clustered, or massively parallel systems gain the largest performance benefits from the parallel query feature because query processing can be effectively split up among many central processing units on a single system.

In some database management systems that provide a parallel query feature, the query is parallelized dynamically at execution time. Thus, if the distribution or location of the data changes, the DBMS automatically adapts to optimize the parallelization for each execution of a SQL statement.

Parallel query processing can be used to execute a variety of statements, including "select" statements; subqueries in "update," "insert," and "delete" statements; "create table . . . as select" statements; and "create index" statements.

Without the parallel query feature, a single server process performs all necessary processing for the execution of a SQL statement. For example, without this feature, to perform a full table scan, one process performs the entire operation. The parallel query feature allows certain operations (for example, full table scans or sorts) to be performed in parallel by multiple query server processes. One process, known as the query coordinator, dispatches the execution of a statement to several query servers and coordinates the results from all of the servers to send the results back to the user.

The query coordinator process is very similar to other server processes, but the query coordinator can break down execution functions into parallel pieces and then integrate the partial results produced by the query servers. Query servers get assigned to each operation in a SQL statement (for example, a table scan or a sort operation), and the number of query servers assigned to a single operation is the degree of parallelism for a query.

When a statement is parsed, an optimizer of the DBMS determines the execution plan of that statement and determines the parallelization method of the execution plan. Parallelization is the process by which the query optimizer determines which operations can be performed in parallel and how many query server processes to execute the execution plan.

To decide how to parallelize a statement, the query optimizer process decides how many query server processes to enlist. When making these decisions, the query optimizer uses information specified in hints of a query, the table's definition and statistics, and initialization parameters. Before enlisting query server processes, the query optimizer process examines the operations in the execution plan to determine whether the individual operations can be parallelized.

The query optimizer process also examines the partitioning requirements of each operation. An operation's partitioning requirement is the way in which the rows operated on by the operation must be divided, or partitioned, among the query server processes. The partitioning scheme might adopt range, hash, round robin, or random techniques.

After determining the partitioning requirement for each operation in the execution plan, the query optimizer determines the order in which the operations must be performed. With this information, the query optmizer determines the data flow of the statement. Operations that require the output of other operations are known as parent operations. For example, within a query, a "group by sort" operation will be the parent of a "merge join" operation within that same query if the "group by sort" operation requires the output of the "merge join" operation.

Parent operations can begin processing rows as soon as the child operations have produced rows for the parent operation to consume. While one set of query servers are producing rows in a child operation (e.g., "full scan"), another set of query servers can begin to perform a parent operation (e.g., "merge join") to consume the rows. Each of the two operations performed concurrently is given its own set of query server processes. Therefore, both query operations and the data flow tree itself have degrees of parallelism. The degree of parallelism of an individual operation is called intra-operation parallelism and the degree of parallelism between operations in a data flow tree is called inter-operation parallelism. Due to the producer/consumer nature of the query operations, only two operations in a given tree need to be performed simultaneously to minimize execution time, so the maximum degree of inter-operation parallelism is 2. When a set of query servers completes its operation, the set moves on to operations higher in the data flow.

Inexpensive database management systems for personal use are relatively simple systems. They tend to have a single objective—to shield the user from the technical details of the database implementation. The databases maintained by these systems are relatively small and generally contain information whose loss or corruption would be inconvenient rather than disastrous. When a problem does arise, the user can usually correct the erroneous items directly or reload the database from a backup copy and manually make the modifications required to bring that copy up to date. This process might be inconvenient, but the cost of avoiding the inconvenience tends to be greater than the inconvenience itself. In any case, the inconvenience is restricted to only a few people, and any financial loss is generally limited.

In the case of large, multiuser, commercial database systems, however, the stakes are much higher. The cost of incorrect or lost data can be enormous and can have devastating consequences. In these environments, a major role of the DBMS is to maintain the database's integrity by guarding against problems such as operations that for some reason are only partially completed or different operations that might interact inadvertently to cause inaccurate information in the database.

A single transaction, such as the transfer of funds from one bank account to another, the cancellation of an airline reservation, or the registration of a student in a university course, might involve multiple steps at the database level. For example, a transfer of funds between bank accounts requires that the balance in one account be decremented and the balance in the other be incremented. Between such steps, the information in the database might be inconsistent. Indeed, funds are missing during the brief period after the first account has been decremented but before the other has been incremented. Likewise, when reassigning a passenger's seat on a flight, there might be an instant when the passenger has no seat or an instant when the passenger list appears to be one passenger greater than it actually is.

In the case of large databases that are subject to heavy transaction loads, it is highly likely that a random snapshot will find the database in the middle of some transaction. A request for the execution of a transaction, or an equipment malfunction, will therefore likely occur at a time when the database is in an inconsistent state.

In the case of a malfunction, the goal of the DBMS is to ensure that the problem will not freeze the database in an inconsistent state. This is often accomplished by maintaining a log containing a record of each transaction's activities in a nonvolatile storage system, such as a magnetic disk. Before a transaction is allowed to alter the database, the alteration to be performed is first recorded in the log. Thus, the log contains a permanent record of each transaction's actions.

The point at which all the steps in a transaction have been recorded in the log is called the "commit point." It is at this point that the DBMS has the information the DBMS needs to reconstruct the transaction on the DBMS's own if that reconstruction should become necessary. At this point, the DBMS becomes committed to the transaction in the sense that the DBMS accepts the responsibility of guaranteeing that the transaction's activities will be reflected in the database. In the case of an equipment malfunction, the DBMS can use the information in its log to reconstruct the transactions that have been completed (committed) since the last backup was made. The DBMS can rerun, from their beginnings, queries within transactions that have not yet been committed.

Long-running queries are more likely to experience a fault and can be extremely costly to rerun. The DBMS might run such queries for hours or days before reaching a commit point. Users and/or applications that do not have workarounds to avoid rerunning a very long query are exposed to a failure between commit points.

Additionally, in a multi-node cluster DBMS, as the number of nodes executing a parallel statement increases, the probability of a node failure also increases. Restarting a query in response to the failure of a node in the cluster consumes the entire cluster for even longer, potentially delaying other workloads.

Furthermore, when the DBMS's workload includes routine extract, transform, and load (ETL) or maintenance workload that usually is processed with little human supervision, a single failure prevents the workload from being completed, in which case human intervention is needed to restart the workload, causing the workload to finish late and potentially delaying other workloads.

Additionally, some users may need to interrupt routine workloads with high-priority jobs. This may become more prevalent in a cloud-computing environment, including dedicated/internal clouds. Stopping a currently executing query in order to release its system resources for use by another query leads to loss of work.

The approaches described in this section are approaches that could be pursued, but not necessarily approaches that have been previously conceived or pursued. Therefore, unless

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques described herein make parallel execution of SQL statements fault-tolerant. Specifically, during parallel query processing, a new row source is created that allows checkpoints to be stored at certain points in the query processing. If a failure occurs, then the query can be restarted from the most recent checkpoint (rather than from the very beginning of the query). The checkpoints are implemented at operation boundaries where rows need to be redistributed among processes. These are natural checkpoint locations because (1) each subsequent operation can proceed from the output of the previous operation, which is stored as a checkpoint, and (2) these operation completions tend to be points in the computation where the query state is minimized, thus minimizing checkpoint storage requirements.

Techniques described herein aim to handle faults, such as process death or instance failure during the execution of a parallel statement, transparently with minimal performance overhead. Techniques described herein can be used relative to query statements, data definition language (DDL) statements, and/or data manipulation language (DML) statements. Because the techniques are transparent, the techniques enable a DBMS to detect failures, recover from failures, and continue parallel execution without human intervention.

Checkpoints as a Fault Tolerance Approach

Standard approaches to fault-tolerance include hardware redundancy, software redundancy, and information redundancy. Hardware redundancy is a common technique for power supplies, fans, and communication channels. Hardware redundancy for processing, such as replicated computation with a voting scheme to select the correct result, is normally used when processing cannot be interrupted but is expensive in resource and power utilization. Software redundancy, such as process pairs and N-version programming, is often used for system processes but is complex to implement and often uses hardware redundancy to protect against hardware failures. Information redundancy combined with hardware redundancy, such as RAID (redundant array of independent disks) and ECC (error correcting code), can also be used for real-time error correction of storage failures but do not apply to processing failures.

A different form of information redundancy, called checkpoints, materializes the entire state of a query at certain points in time. Checkpoints are materialized by storing a copy of the state to other memory, such as disk, flash memory device, or the volatile memory of another node. After any failure subsequent to the materialization of the most recent checkpoint, processing can be restarted from that checkpoint. Consequently, only the work that had occurred since that checkpoint is lost. Checkpoints are a relatively inexpensive fault-tolerance technique that may be used when an application can pause for recovery. Checkpoints may serve as the basis for transaction processing fault-tolerance, where the checkpoints are the transaction boundaries. Database management systems may have transaction management components that materialize transactions and provide roll-back and roll-forward capabilities using transaction semantics and checkpoints.

Described herein are approaches for using checkpoints to recover the parallel execution of a statement when one of more of the parallel processes processing that statement fails.

Selective and Limited Checkpoint Materialization

One potential approach to protecting parallel statement execution might involve the materialization of all intermediate results of all execution steps. However, if used relative to parallel statement execution in a DBMS, the materialization of all intermediate results would be prohibitively expensive in performance degradation and storage. Nevertheless, the use of checkpoints at a finer-grained level than transaction boundaries clearly would be beneficial.

Therefore, in one embodiment of the invention, checkpoints are introduced only at positions within the parallel processing of a query at which the processing time that would be saved by restarting query operations at those positions rather than from previous checkpoints (or the beginning of the query) are significant (e.g., beyond a specified minimum threshold of processing time). Additionally, in one embodiment of the invention, checkpoints are introduced only at positions within the parallel processing of a query at which the cost of materialization of that checkpoint is minimized (e.g., due to there being less state information to store at that position compared to other positions). This selectivity in positions of checkpoint materialization reduces the performance overhead and space usage incurred by checkpoint materialization as much as possible while requiring little extra computing resource compared with an original checkpoint-free parallel execution of the query.

Checkpoint Implementation

In one embodiment of the invention, checkpoints are created (or, in other words, materialized) at the data flow operator (DFO) level. As used herein, a DFO is a set of one or more query operations that can be executed on one set of processes (referred to below as a "slave set") without redistributing rows. This set of processes performs the intra-operation parallelism between operations described previously. Rows are then distributed between two connecting DFOs. Because a DFO is completely defined by its inputs, DFO boundaries provide a natural location at which to create checkpoints. DFO boundaries are also appropriate checkpoint locations because they tend to be places at which the query state is minimized. Consequently, materializing checkpoints at DFO boundaries minimizes the amount of data that needs to be materialized to record those checkpoints.

Figure 1:
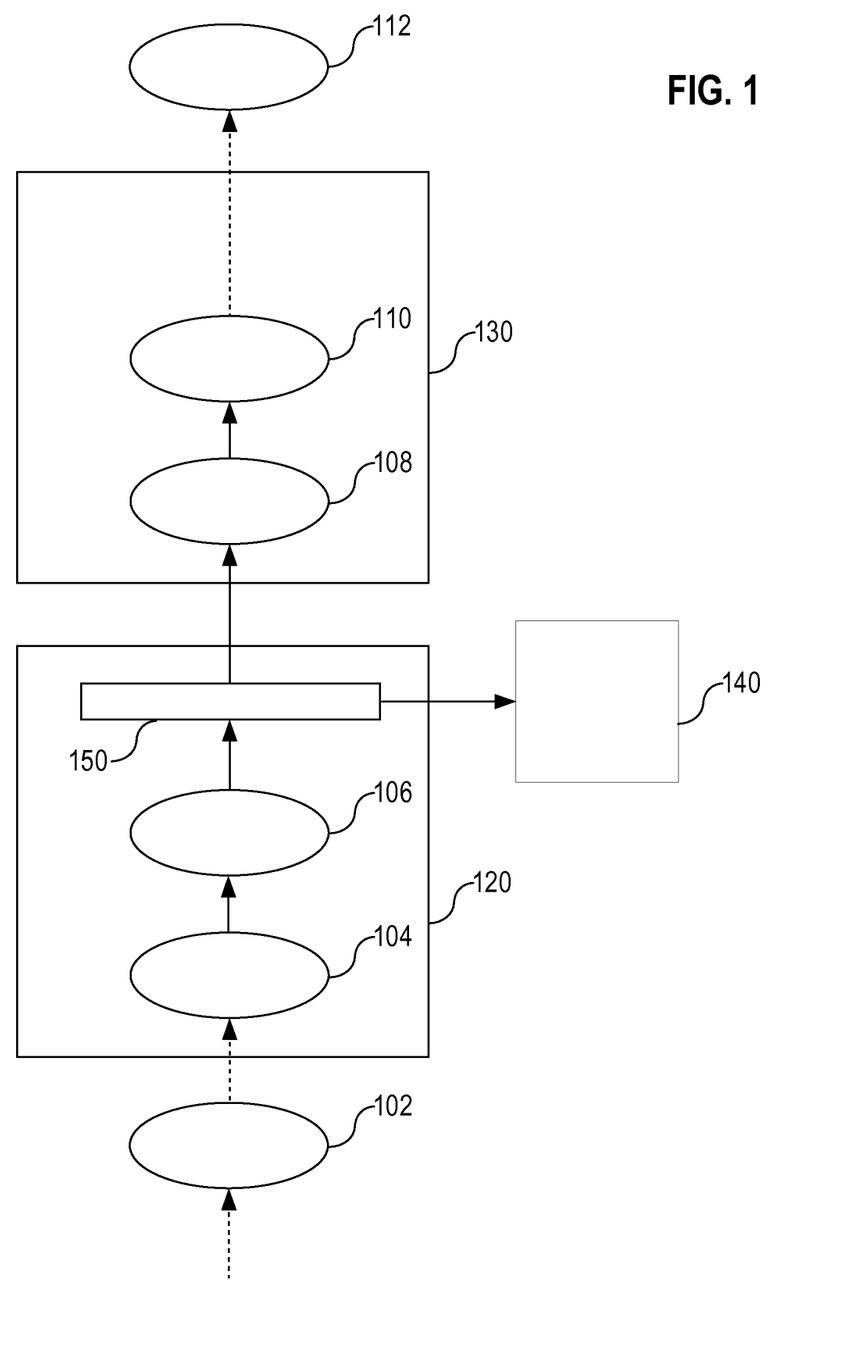
FIG. 1 is a block diagram illustrating the addition of a fault tolerance buffer (FTB) at the output of a data flow operator, according to an embodiment of the invention.

FIG. 1 is a block diagram illustrating the addition of a fault tolerance buffer (FTB) at the output of a data flow operator, according to an embodiment of the invention. FIG. 1 shows DFOs 120 and 130. DFO 120 is currently in the role of a producer DFO, while DFO 130 is currently in the role of a consumer DFO. As indicated by their names, a consumer DFO is any DFO that consumes rows produced by a producer DFO. The same DFO can serve as a consumer DFO at some time and then become a producer DFO later. Usually, at any point in time, only one consumer-producer DFO pair is being executed, and each DFO in the pair is executed on its own slave set. DFO 120 includes operations 104 and 106. DFO 108 includes operations 108 and 110. DFO 120 receives input from operation 102. DFO 130 receives input from DFO 120. Operation 112 receives input from DFO 130.

According to an embodiment of the invention, checkpoints are created at the output of a DFO. Checkpoints are implemented by creating a new row source called a "fault-tolerance buffer" (FTB). As shown in FIG. 1, FTB 150 is created at the output of DFO 120. FTB 150 receives input from operation 106—the final operation of DFO 120. DFO 130 receives input from FTB 150. FTB 150 contains the output of DFO 120 and can thus serve as a row source for subsequent DFO 130. If a failure occurs in consumer DFO 130 or its corresponding producer DFO 120, producer DFO 120 can reproduce all of that producer DFO's rows (the products of the execution of its operations as part of the parallel query execution) using FTB 150, which allows consumer DFO 130 to redo any work in progress and limits the lost work to that work in progress. After producer DFO 120 finishes operations 104 and 106 relative to all input data, the contents of FTB 150 are materialized to other memory 140, which may be a form of non-volatile memory or volatile memory of another node; FTB 150 is, in one embodiment of the invention, created and maintained in volatile memory of one or more other nodes. This materialization creates a checkpoint. Because FTB 150 does not depend on any characteristics of DFO 120, fault-tolerance is decoupled from existing row sources and operators.

According to an embodiment of the invention, when consumer DFO 130 finishes its processing, consumer DFO 130 also will store the output (the products of its processing) in an FTB (not shown) and then transition to become a producer DFO relative to another consumer DFO (not shown). At that point in the computation, two checkpoints have been created (one for DFO 120 and one for DFO 130), but only the most recent checkpoint is needed to recover the computation, so, in one embodiment, the older checkpoint is deleted to save storage space if needed. Each producer/consumer DFO pair continues in this manner, with the consumer DFO saving the output of its processing in an FTB and then becoming a producer DFO, until the query processing is complete.

Coordinating Checkpoint Creation

Figure 2:
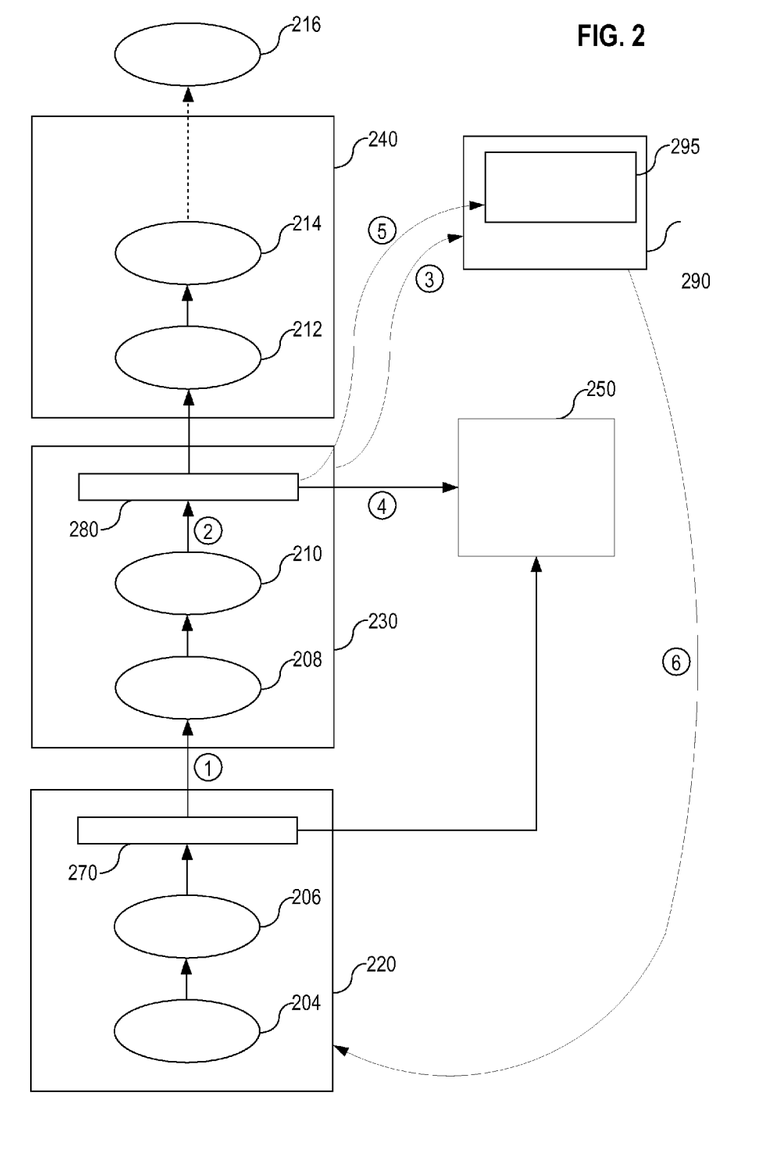
FIG. 2 is a block diagram that illustrates a protocol for checkpointing, according to an embodiment of the invention.

According to one embodiment of the invention, a query coordinator component called the checkpoint manager coordinates the creation of checkpoints, while a query coordinator component called the recovery manager coordinates the use of checkpoints to perform fault recovery. FIG. 2 is a block diagram that illustrates a protocol for checkpointing, according to an embodiment of the invention. DFOs 220, 230, and 240 are shown. DFO 220 includes operations 204 and 206. DFO 220 further includes FTB 270. DFO 230 includes operations 208 and 210. DFO 230 further includes FTB 280. DFO 240 includes operations 212 and 214. Operation 216 receives input from DFO 240. FTB 270 stores its contents to other memory 250 to create a checkpoint. FTB 280 stores its contents to other memory 250 to create a checkpoint. Query coordinator 290, which may be implemented as a multi-threaded process, coordinates the execution of the query of which DFOs 220, 230, and 240 are a part. Query coordinator 290 further includes checkpoint manager 295, which coordinates the creation of checkpoints.

At the moment in time shown in FIG. 2, producer DFO 220 and consumer DFO 230 pair are being worked on concurrently by slave sets, and producer DFO 220 already has a checkpoint stored in non-volatile storage 250. In the example shown, the degree of parallelism for the query plan might be considered to be four, in which case a separate set of four slave processes will work on each DFO—one set of four slave processes for DFO 220 and a separate set of four slave processes for DFO 230. The outputs of each one of the slave processes in the slave set for DFO 220 (the producer slave set) are distributed as inputs among all of the slave processes in the slave set for DFO 230 (the consumer slave set).

According to one embodiment, the checkpointing protocol proceeds as follows, with reference to the circumscribed numerals shown in FIG. 2. At step 1, the producer slaves working on DFO 220 send output rows to the consumer slaves working on DFO 230. At step 2, each consumer slave working on DFO 230 processes its input and stores its output rows into FTB 280. At step 3, each consumer slave working on DFO 230, once it receives the end-of-file message from all of the producer slaves from which it receives input, sends a work completion message to query coordinator 295, informing query coordinator 295 that the producer slaves have finished sending rows to that consumer slave.

At step 4, each consumer slave working on DFO 230, once that consumer slave has finished processing all its inputs and has stored the results into FTB 280, stores, to other memory 250, the part of the contents of FTB 280 that the consumer slave placed in FTB 280. This creates a durable checkpoint for consumer DFO 230 output for that consumer slave. At step 5, once a consumer slave is done check pointing (storing to other memory 250 the part of the contents of FTB 280 that the consumer slave placed in FTB 280), that consumer slave sends, to checkpoint manager 295, a checkpoint completion message that indicates the location (e.g., on disk) of the checkpoint stored in other memory 250. This message indicates that the work for that consumer slave is done.

At step 6, once query coordinator 290 has received, from all of the slaves working on DFO 230, the work completion message sent in step 3, and once checkpoint manager 295 has received, from all slaves working on DFO 230, the checkpoint completion message sent in step 5, query coordinator 290 sends a role switching message to all the producer slaves that were working on DFO 220, instructing those producer slaves to begin working on the next DFO 240 in the query processing plan. Upon receiving the role switching message sent in step 6, the producer slaves that were working on DFO 220 start working on the next DFO 240 and become the new consumer slaves. The previous consumer slaves, which were working on DFO 230, begin working as producer slaves on the same DFO 230, sending output to the consumer slaves working on DFO 240.

Coordinating Fault Recovery

Figure 3:
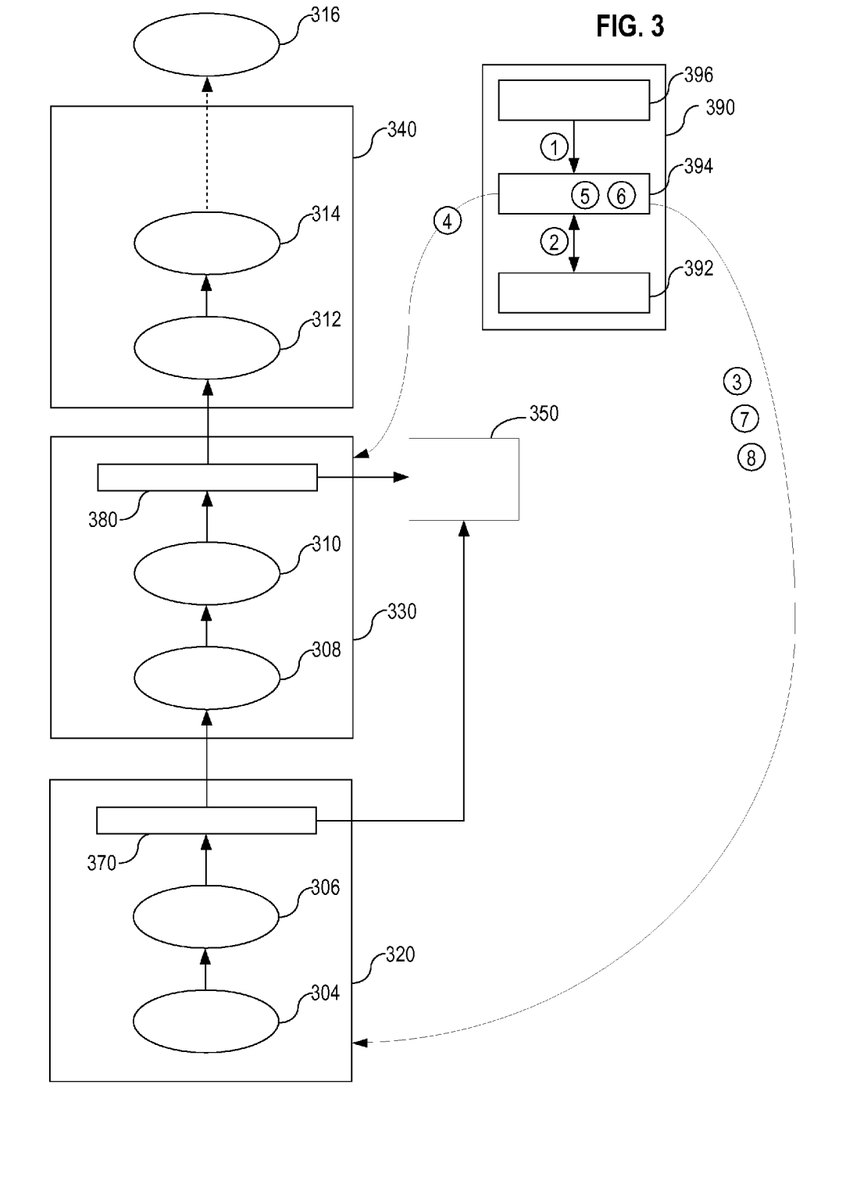
FIG. 3 is a block diagram that illustrates a protocol for fault recovery, according to an embodiment of the invention.

FIG. 3 is a block diagram that illustrates a protocol for fault recovery, according to an embodiment of the invention. DFOs 320, 330, and 340 are shown. DFO 320 includes operations 304 and 306. DFO 320 further includes FTB 370. DFO 330 includes operations 308 and 310. DFO 330 further includes FTB 380. DFO 340 includes operations 312 and 314. Operation 316 receives input from DFO 340. FTB 370 stores its contents to other memory 350 to materialize the contents and create a checkpoint. FTB 380 stores its contents to other memory 350 to materialize the contents and create a checkpoint. Query coordinator 390, which may be implemented as a multi-threaded process, coordinates the execution of the query of which DFOs 320, 330, and 340 are a part. Query coordinator 390 further includes checkpoint manager 392, which coordinates the creation of checkpoints. Query coordinator also includes recovery manager 394, which coordinates the use of checkpoints to perform fault recovery. Query coordinator 390 additionally includes fault detector 396, which detects faults among slave processes and/or the connections between those slave processes. In the example shown, the degree of parallelism for the query plan might be considered to be four, in which case a separate set of four slave processes will work on each DFO—one set of four slave processes for DFO 320 and a separate set of four slave processes for DFO 330. The outputs of each one of the slave processes in the slave set for DFO 320 (the producer slave set) are distributed as inputs among all of the slave processes in the slave set for DFO 330 (the consumer slave set).

According to one embodiment, the fault recovery protocol proceeds as follows, with reference to the circumscribed numerals shown in FIG. 3. At step 1, fault detector 396 detects a fault (e.g., failure of a slave process or failure of a connection between slave processes) and notifies recovery manager 394. At step 2, recovery manager 394 communicates with the checkpoint manager 392 to determine the appropriate checkpoint, checkpoint location, and DFO to use for the recovery. Typically, the appropriate checkpoint will be the most recently stored checkpoint. At step 3, recovery manager 394 sends messages to all producer slaves working on DFO 320, instructing the producer slaves stop sending rows to the consumer slaves working on DFO 330. At step 4, recovery manager 394 sends abort messages to all consumer slaves working on DFO 330. At step 5, recovery manager 394 acquires new slave processes to replace the faulting slave processes. At step 6, recovery manager 394 remaps the slave sets and restores the execution context, as indicated in the appropriate checkpoint. At step 7, recovery manager 394 sends the address of the FTB for the appropriate checkpoint to all producer slaves working on DFO 320, which they use as a row source for restarting DFO 330; earlier DFOs in the query plan (if any) do not need to be restarted because their output was restored in step 6. At step 8, recovery manager 394 sends messages to all producer slaves working on DFO 320, instructing them to restart execution from the latest checkpoint by resending output rows to the consumer slaves working on DFO 330. After step 8, the query has resumed, and consumer DFO 330 will be replayed without requiring re-performance of any other DFO earlier in the query execution plan.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
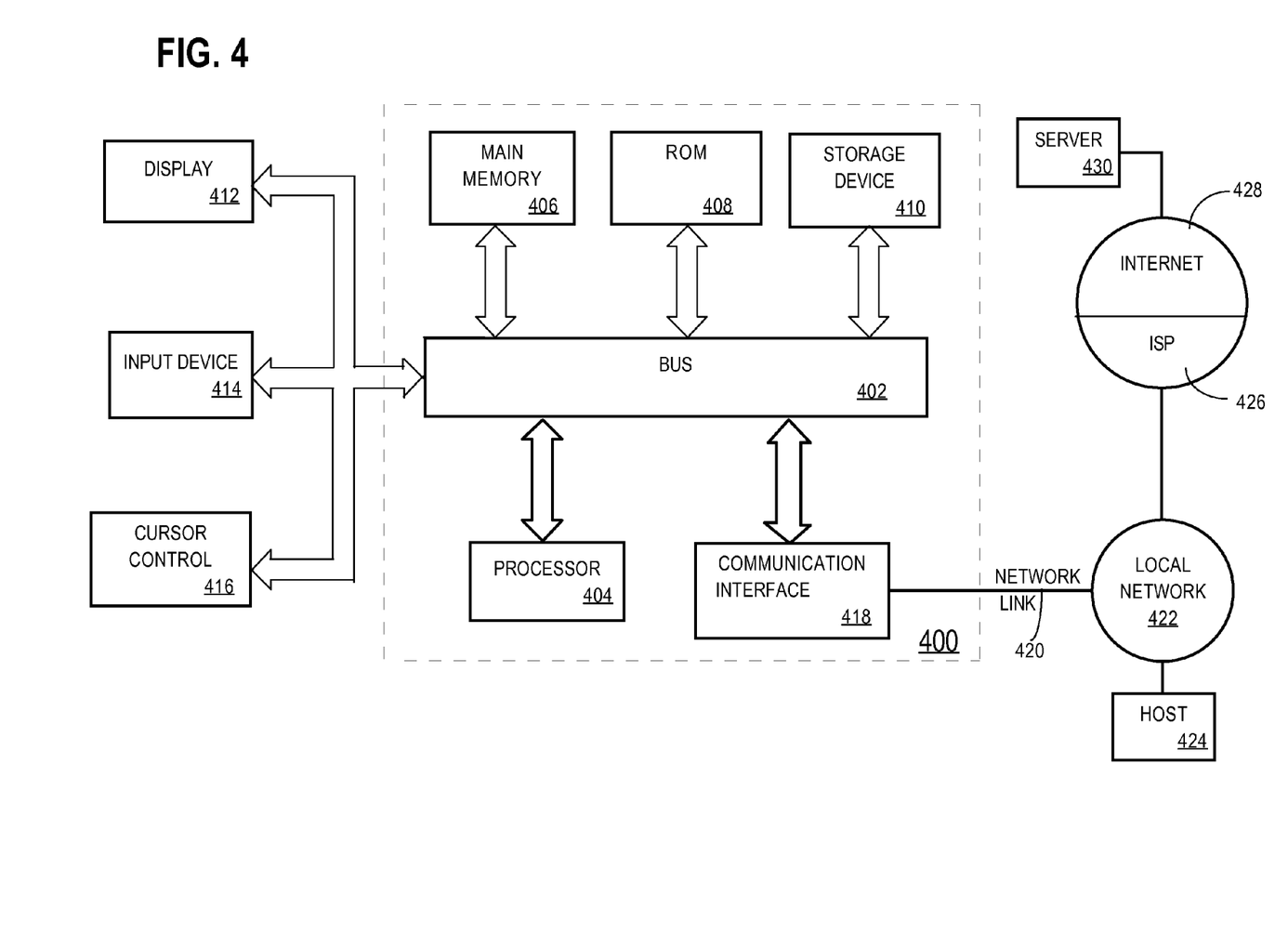
FIG. 4 is a block diagram of a computer system upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, flash memory devices, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a particular consumer slave, which receives input rows from producer slaves during parallel processing of a query, processing said input rows as said particular consumer slave receives said input rows;
said particular consumer slave storing output rows, which said particular consumer slave produces by processing said input rows, into a buffer maintained in volatile memory;
determining that all the producer slaves from which the particular consumer slave receives said input rows have finished sending rows to the particular consumer slave;
in response to determining that all the producer slaves from which the particular consumer slave receives said input rows have finished sending rows to the particular consumer slave, storing a copy of rows from the buffer that were stored in the buffer by the particular consumer slave;
wherein said processing comprises performing one or more query operations from a single data flow operator that specifies a set of query operations that are executable on a set of consumer slaves, including the particular consumer slave, without redistributing rows processed by said set of consumer slaves to an other consumer slave to perform said set of one or more query operations; and
wherein said method is performed in a system in which output rows are stored into buffers by consumer slaves at outputs of data flow operators.

2. The method of claim 1, further comprising:
in response to detecting a fault during said parallel processing of said query, restoring query state based on information stored into a non-volatile storage; and
using said information stored into said non-volatile storage to re-perform operations of a particular data flow operator on which the producer slaves were working at a time that the fault was detected; and
resuming parallel processing of said query without re-performing operations of any data flow operator preceding said particular data flow operator in a query execution plan for the query.

3. The method of claim 1, further comprising:
in response to determining that each consumer slave of the set of consumer slaves has finished processing all input rows produced by all producer slaves from which said each consumer slave receives input rows, (1) causing each consumer slave in the set of consumer slaves to become a new producer slave working on the single data flow operator, and (2) causing each producer slave that had been producing rows for the single data flow operator to become a consumer slave that processes rows output by each new producer slave.

4. The method of claim 1, further comprising:

creating a new checkpoint for the single data flow operator by storing a copy of all rows produced by all consumer slaves working on the single data flow operator; and in response to creating said new checkpoint, deleting, from a non-volatile storage, an old checkpoint that was formerly created for a previous data flow operator.

5. A method comprising:

creating a query execution plan for a query;

wherein creating the query execution plan comprises creating two or more data flow operators that each specify a set of query operations that are executable on a set of consumer slaves without redistributing rows processed by said set of consumer slaves to any other consumer slave to perform said set of one or more query operations;

selecting one or more outputs of the two or more data flow operators at which to place fault-tolerance buffers;

placing fault-tolerance buffers only at each of the said one or more outputs of the data flow operators without placing any fault-tolerance buffers at any operator output that is not a data flow operator output;

in response to detecting a fault during processing of the query, determining a most recent checkpoint stored to non-volatile storage from a fault-tolerance buffer of said fault-tolerance buffers;

restoring a query state based on information contained in said checkpoint;

sending, to a plurality of producer slaves, rows that are contained in said checkpoint; and said producer slaves processing said rows and sending results of said processing to a plurality of consumer slaves that process said results while said producer slaves are processing said rows, thereby restarting execution said query execution plan from a point after completion of a last data flow operator at which a checkpoint was made without re-performing work performed for any data flow operators preceding or including said last data flow operator.

6. The method of claim 5, wherein the step of selecting the one or more outputs of the two or more data flow operators is based on an amount of work that will not need to be re-performed when a fault occurs in the query execution plan between said one or more outputs and a checkpoint established in the query execution plan previous to said one or more outputs.

7. The method of claim 5, wherein the step of selecting the one or more outputs of the two or more data flow operators is based on an amount of state that will need to be stored in order to establish a checkpoint at the one or more outputs of the two or more data flow operators.

8. The method of claim 5, further comprising:

two or more consumer slaves storing, into a particular fault-tolerance buffer established at an output of a particular data flow operator upon which the two or more consumer slaves are working, output rows that are products of processing that the two or more consumer slaves performed upon input rows that the two or more consumer slaves received from two or more producer slaves working on a data flow operator preceding the particular data flow operator in the query execution plan.

9. The method of claim 5, further comprising:

in response to a particular consumer slave, of a plurality of consumer slaves working on a first data flow operator, receiving an end-of-file message from each of a plurality of producer slaves working on a second data flow operator that precedes the first data flow operator in the query execution plan, the particular consumer slave causing rows, which the particular consumer slave stored into a particular fault-tolerance buffer associated specifically with the first data flow operator and not with the second data flow operator, to be transferred from the particular fault-tolerance buffer onto non-volatile storage.

10. A non-transitory computer-readable medium storing instructions which, when executed by one or more processors, cause performance of a method comprising steps of:

a particular consumer slave, which receives input rows from producer slaves during parallel processing of a query, processing said input rows as said particular consumer slave receives said input rows;

said particular consumer slave storing output rows, which said particular consumer slave produces by processing said input rows, into a buffer maintained in volatile memory;

determining that all the producer slaves from which the particular consumer slave receives said input rows have finished sending rows to the particular consumer slave;

in response to determining that all the producer slaves from which the particular consumer slave receives said input rows have finished sending rows to the particular consumer slave, storing a copy of rows from the buffer that were stored in the buffer by the particular consumer slave;

wherein said processing comprises performing one or more query operations from a single data flow operator that specifies a set of query operations that are executable on a set of consumer slaves, including the particular consumer slave, without redistributing rows processed by said set of consumer slaves to any other consumer slave to perform said set of one or more query operations; and wherein said method is performed in a system in which output rows are stored into buffers by consumer slaves at outputs of data flow operators.

11. The non-transitory computer-readable medium of claim 10, said steps further comprising:

in response to detecting a fault during said parallel processing of said query, restoring query state based on information stored into a non-volatile storage; and using said information stored into said non-volatile storage to re-perform operations of a particular data flow operator on which the producer slaves were working at a time that the fault was detected; and resuming parallel processing of said query without re-performing operations of any data flow operator preceding said particular data flow operator in a query execution plan for the query.

12. The non-transitory computer-readable medium of claim 10, said steps further comprising:

in response to determining that each consumer slave of the set of consumer slaves has finished processing all input rows produced by all producer slaves from which said each consumer slave receives input rows, (1) causing each consumer slave in the set of consumer slaves to become a new producer slave working on the single data flow operator, and (2) causing each producer slave that had been producing rows for the single data flow operator to become a consumer slave that processes rows output by each new producer slave.

13. The non-transitory computer-readable medium of claim 10, said steps further comprising:

creating a new checkpoint for the single data flow operator by storing a copy of all rows produced by all consumer slaves working on the single data flow operator; and in response to creating said new checkpoint, deleting, from a non-volatile storage, an old checkpoint that was formerly created for a previous data flow operator.

14. A non-transitory computer-readable medium storing instructions which, when executed by one or more processors, cause performance of a method comprising steps of:

creating a query execution plan for a query;

wherein creating the query execution plan comprises creating two or more data flow operators that each specify a set of query operations that are executable on a set of consumer slaves without redistributing rows processed by said set of consumer slaves to any other consumer slave to perform said set of one or more query operations;

selecting one or more outputs of the two or more data flow operators at which to place fault-tolerance buffers;

placing fault-tolerance buffers only at each of the said one or more outputs of the data flow operators without placing any fault-tolerance buffers at any operator output that is not a data flow operator output;

in response to detecting a fault during processing of the query, determining a most recent checkpoint stored to non-volatile storage from a fault-tolerance buffer of said fault-tolerance buffers;

restoring a query state based on information contained in said checkpoint;

sending, to a plurality of producer slaves, rows that are contained in said checkpoint; and said producer slaves processing said rows and sending results of said processing to a plurality of consumer slaves that process said results while said producer slaves are processing said rows, thereby restarting execution said query execution plan from a point after completion of a last data flow operator at which a checkpoint was made without re-performing work performed for an data flow a operators preceding or including said last data flow operator.

15. The non-transitory computer-readable medium of claim 14, wherein the step of selecting the one or more outputs of the two or more data flow operators is based on an amount of work that will not need to be re-performed when a fault occurs in the query execution plan between said one or more outputs and a checkpoint established in the query execution plan previous to said one or more outputs.

16. The non-transitory computer-readable medium of claim 14, wherein the step of selecting the one or more outputs of the two or more data flow operators is based on an amount of state that will need to be stored in order to establish a checkpoint at the one or more outputs of the two or more data flow operators.

17. The non-transitory computer-readable medium of claim 14, said steps further comprising:

two or more consumer slaves storing, into a particular fault-tolerance buffer established at an output of a particular data flow operator upon which the two or more consumer slaves are working, output rows that are products of processing that the two or more consumer slaves performed upon input rows that the two or more consumer slaves received from two or more producer slaves working on a data flow operator preceding the particular data flow operator in the query execution plan.

18. The non-transitory computer-readable medium of claim 14, said steps further comprising:

in response to a particular consumer slave, of a plurality of consumer slaves working on a first data flow operator, receiving an end-of-file message from each of a plurality of producer slaves working on a second data flow operator that precedes the first data flow operator in the query execution plan, the particular consumer slave causing rows, which the particular consumer slave stored into a particular fault-tolerance buffer associated specifically with the first data flow operator and not with the second data flow operator, to be transferred from the particular fault-tolerance buffer onto non-volatile storage.

* * * * *

UNITED STATES PATENT AND TRADEMARK OFFICE
CERTIFICATE OF CORRECTION

PATENT NO. : 8,572,051 B1  
APPLICATION NO. : 13/569377  
DATED : October 29, 2013  
INVENTOR(S) : Chen et al.

Page 1 of 1

It is certified that error appears in the above-identified patent and that said Letters Patent is hereby corrected as shown below:

In the Specification

In column 5, line 8-9, delete "fault tolerance" and insert -- fault-tolerance --, therefor.

In column 7, line 5-6, delete "fault tolerance" and insert -- fault-tolerance --, therefor.

In the Claims

In column 12, line 41, in Claim 1, delete "an" and insert -- any --, therefor.

In column 15, line 38, in Claim 14, delete "an" and insert -- any --, therefor.

In column 15, line 38, in Claim 14, delete "a operators" and insert -- operators --, therefor.

Signed and Sealed this  
Third Day of June, 2014

Michelle K. Lee  
*Deputy Director of the United States Patent and Trademark Office*